(No Model.)
T. N. MATHIAS.
FLY NET.
No. 418,038. Patented Dec. 24, 1889.
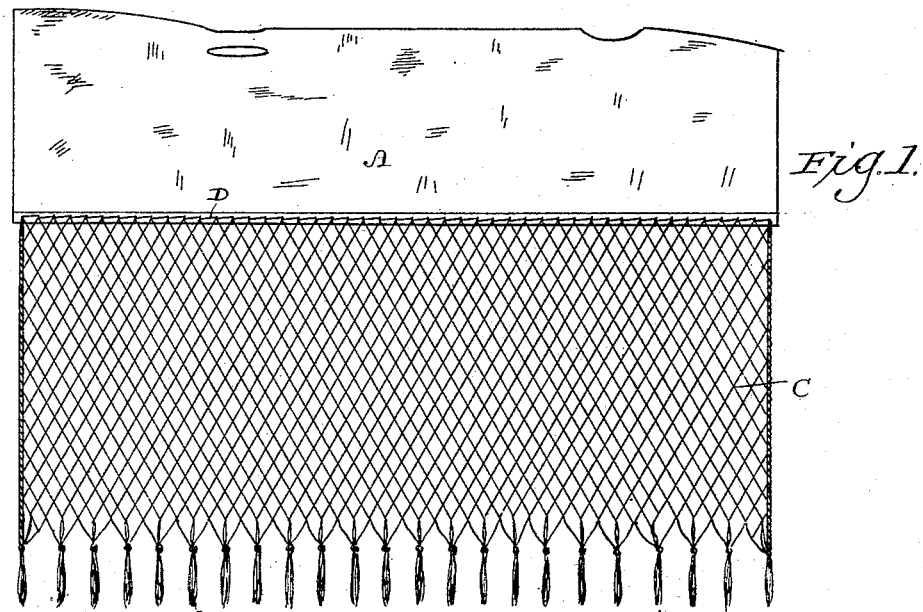
Fig. 1.
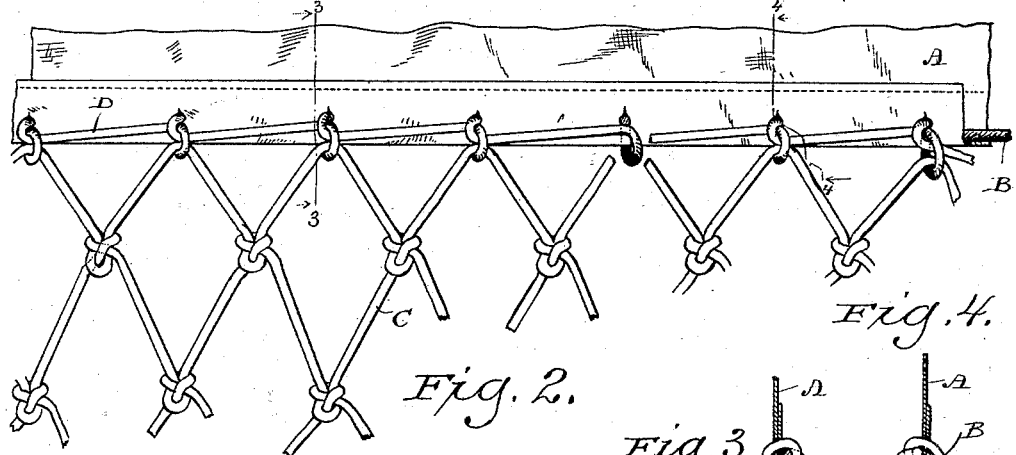
Fig. 2.
Fig. 3. Fig. 4.
Fig. 5.
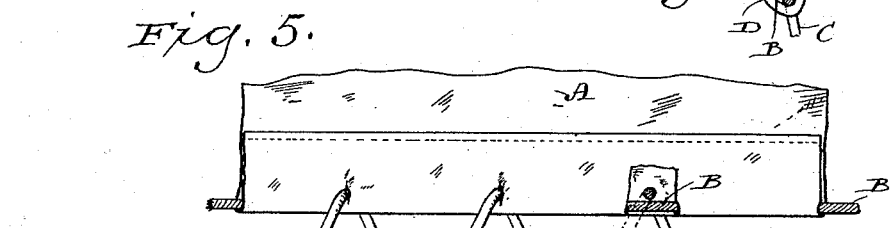
Witnesses
Geo. W. Young.
N. E. Oliphant.
Inventor
Theodore N. Mathias
By Stout & Underwood
Attorneys

UNITED STATES PATENT OFFICE.

THEODORE N. MATHIAS, OF MILWAUKEE, WISCONSIN.

FLY-NET.

SPECIFICATION forming part of Letters Patent No. 418,038, dated December 24, 1889.

Application filed July 1, 1889. Serial No. 316,195. (No model.)

*To all whom it may concern:*

Be it known that I, THEODORE N. MATHIAS, of Milwaukee, in the county of Milwaukee, and in the State of Wisconsin, have invented certain new and useful Improvements in Fly-Nets; and I do hereby declare that the following is a full, clear, and exact description thereof.

My invention relates to fly-nets for horses; and it consists in certain peculiarities of construction and combination of parts, to be hereinafter described with reference to the accompanying drawings, and subsequently claimed.

In the drawings, Figure 1 represents a portion of a fly-net constructed according to my invention; Fig. 2, a like view of the device on an enlarged scale; Figs. 3 and 4, detail sectional views, respectively, taken on lines 3 3 and 4 4, Fig. 2; and Fig. 5 a portion of a net made in accordance with another form of my invention.

Referring by letter to the drawings, A represents a strip, that is preferably of canvas or other suitable textile material, that forms the back-piece of my fly-net, this textile strip being provided with openings for the hames, terrets, and other projecting parts of a harness, and in practice the neck portion (not shown) of said back-piece will be provided with openings for the ears of a horse. The edges of the back-piece A are turned up over stay-cords B and stitched down or otherwise secured in place.

In that form of my invention shown by Figs. 1 and 2 a mesh fringe C is secured to the edges of the back-piece by means of lace-cords D, that pass through said stay-piece at suitable intervals over the stay-cords B, and are looped at these intervals around said stay-cords and the cord that forms upper loops of the mesh fringe C, the latter being of ordinary construction, such as is common in seines and other mesh-work.

The stay-cords B prevent the lace-cords D from tearing out of the material composing the back-piece, and the latter cords form the preferred means for uniting said back-piece and the mesh fringe.

As shown in Fig. 5, the formation of the mesh fringe C may begin at the edges of the back-piece, the cords forming the upper loops of said fringe being passed through the material forming said back-piece and over the stay-cords, whereby said cords that form the upper loops of the fringe are prevented from tearing out of said material.

I am aware that neither a solid back-piece nor a mesh fringe is broadly new in the art to which my invention relates. I am also aware that strips of leather, straight pieces of cord, or other suitable material have been knotted or otherwise attached to such a back-piece to form a fringe, but such I do not claim.

Having thus described my invention, what I claim as new, and desire to secure by Letters Patent, is—

1. A fly-net comprising a solid back-piece having the edges thereof turned up and secured in place, stay-cords inserted in the folded edges of the back-piece, and a mesh fringe connected to said edges and stay-cords, substantially as set forth.

2. A fly-net comprising a solid back-piece having the edges thereof provided with stay-cords, a mesh fringe, and a lace-cord run through the back-piece and fringe at certain intervals and looped at these intervals to said stay-cords, substantially as set forth.

3. A fly-net comprising a solid back-piece of textile material having the edges thereof turned up and secured in place, stay-cords inserted in the folded edges of the back-piece, a mesh fringe, and a lace-cord run through said back-piece and fringe at certain intervals and looped at these intervals around the stay-cords, substantially as set forth.

In testimony that I claim the foregoing I have hereunto set my hand, at Milwaukee, in the county of Milwaukee and State of Wisconsin, in the presence of two witnesses.

THEODORE N. MATHIAS.

Witnesses:
 N. E. OLIPHANT,
 WM. KLUG.